March 4, 1969          H. C. BARBIE ET AL          3,431,554
TRAFFIC SAFETY SIGNALLING SYSTEM
Filed Aug. 8, 1967                                Sheet 1 of 2
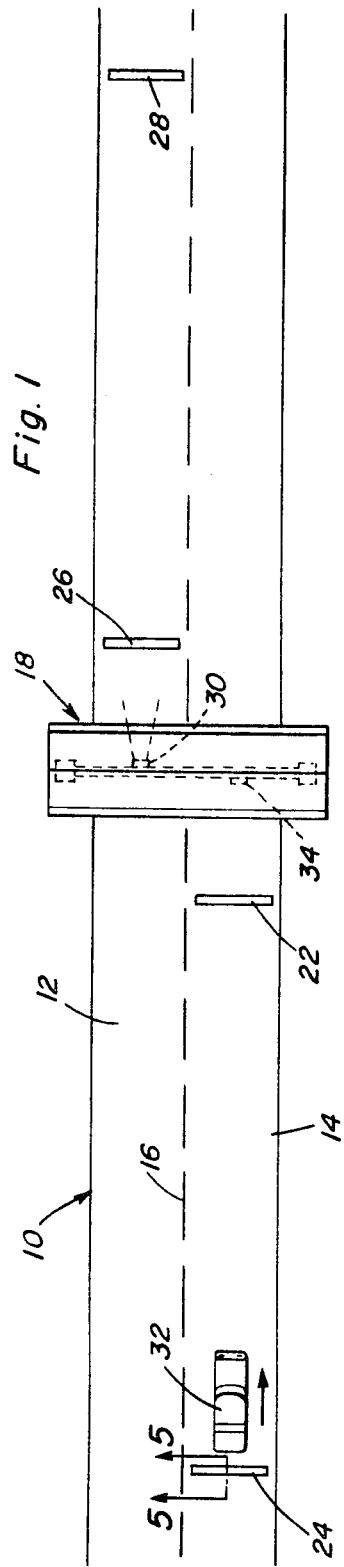
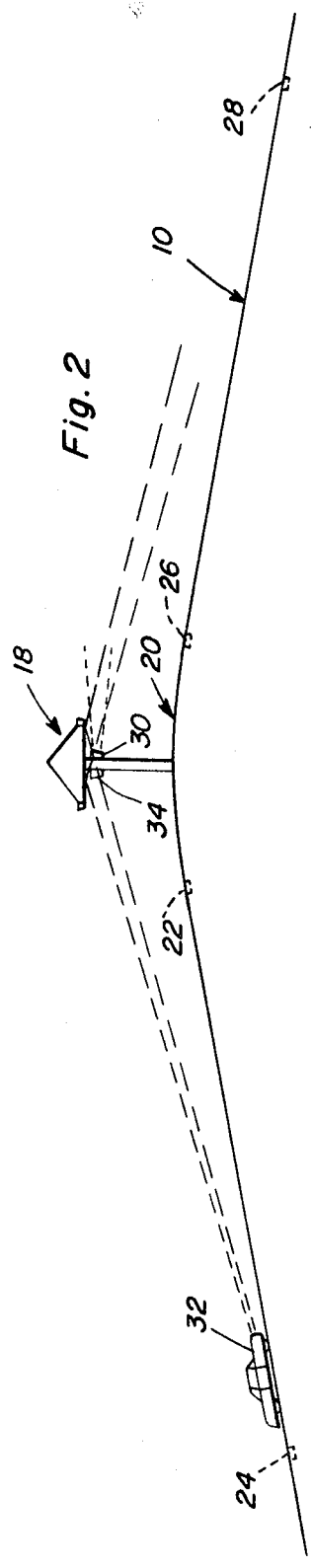
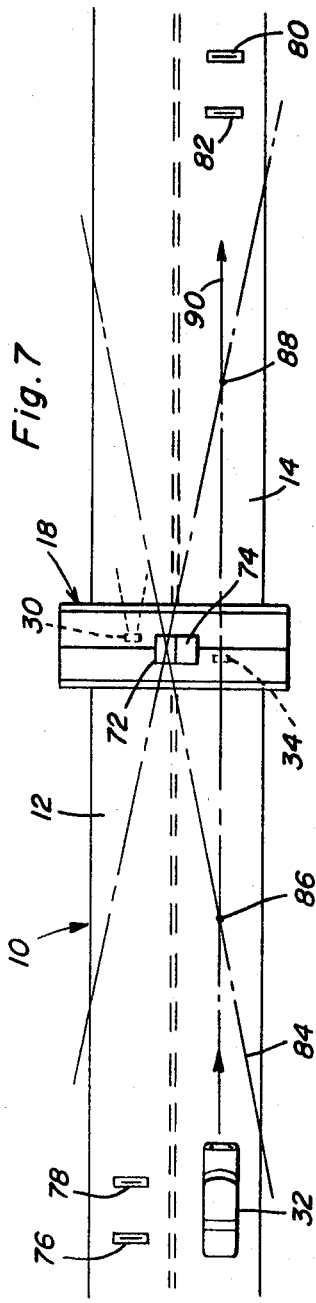
Helen C. Barbie
John N. Barbie
INVENTORS
BY Clarence A. O'Brien
and Harvey B. Jacobson
Attorneys

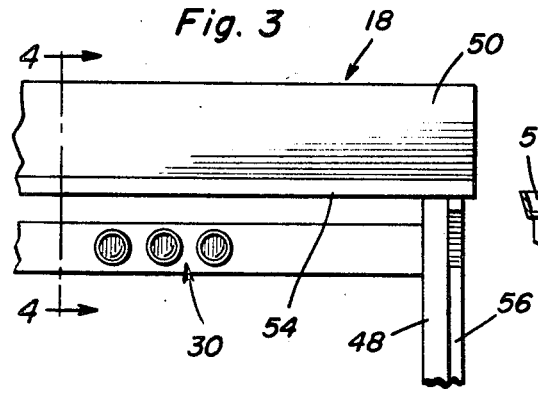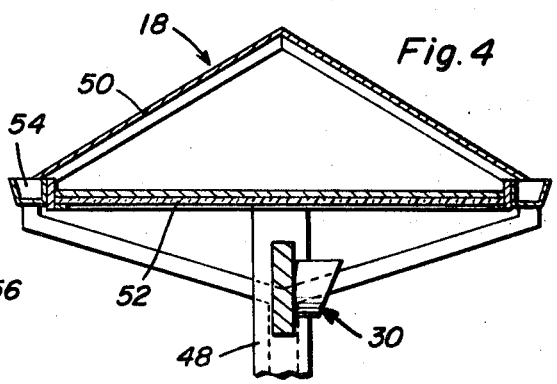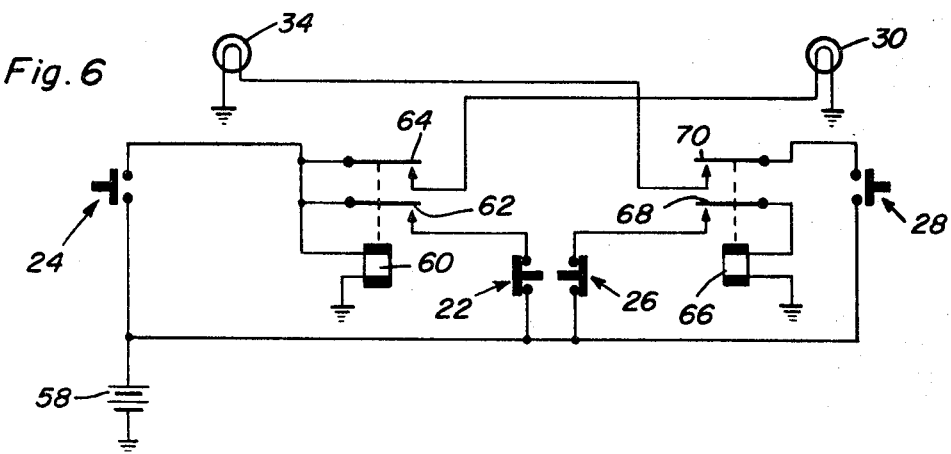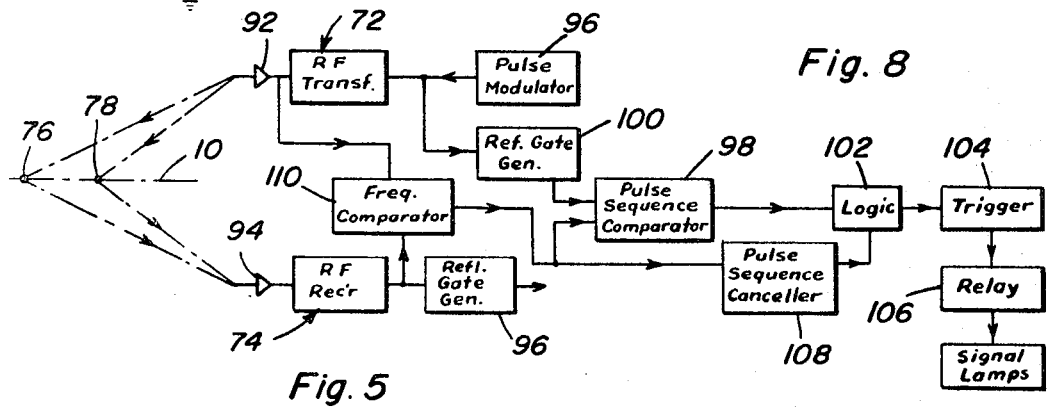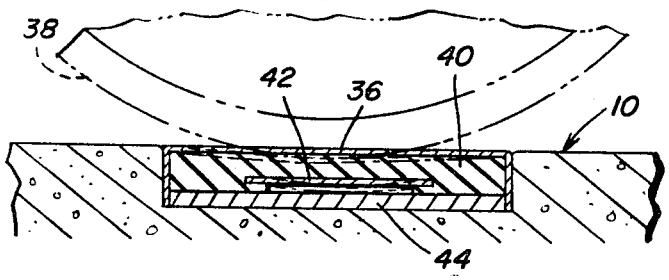

United States Patent Office 3,431,554
Patented Mar. 4, 1969

3,431,554
TRAFFIC SAFETY SIGNALLING SYSTEM
Helen C. Barbie and John N. Barbie, both of
8 St. Mark Drive, St. Peters, Mo. 63376
Continuation-in-part of application Ser. No. 417,048,
Dec. 9, 1964. This application Aug. 8, 1967, Ser.
No. 659,140
U.S. Cl. 340—32                  9 Claims
Int. Cl. G08g 1/02, 1/04

ABSTRACT OF THE DISCLOSURE

A traffic signalling system establishing no-passing zones on either side of the hillcrest signal lamp assembly for warning motorists approaching the hillcrest of the unseen approach of vehicles in the other direction. The zones are established by roadway embedded components cooperating with an electrical control circuit at the lamp assembly protectively enclosed by a roof that also mounts a horizontal reflector of the optical type to augment the warning provided by the signal lamps at night.

---

This invention relates to a traffic signalling system for warning motorists against passing along a two lane roadway within a zone established on either side of a location from which motorists in vehicles approaching in opposite directions cannot see each other. This application is a continuation-in-part of our prior copending application U.S. Ser. No. 417,048, filed Dec. 9, 1964 and now abandoned.

The inability of vehicle motorists to see approaching vehicles travelling in opposite directions is often the cause of serious accidents while travelling along two lane highways. Such accidents are sometimes caused because the motorists disregard regulations forbidding passing or lane crossing within dangerous zones along the highway such as on either side of hillcrests. The provision of a signalling system at the hillcrest from which motorists approaching in opposite directions may be warned, should therefore reduce this cause of accident. Such signalling systems must of course be relatively inexpensive to install but reliable in operation and must also be capable of establishing realistic safety zones on either side of the hillcrest or other location from which vehicles approaching from opposite directions are not visible to the motorists.

In accordance with the present invention, the safety zones are established by roadway embedded components to define the zones spaced from the hillcrest location on either side a short distance and extending away from the hillcrest the desired distance. A roof protected lamp assembly is mounted at the hillcrest having signal lamps facing in opposite directions over the lanes of approaching vehicles, these lamps being illuminated and extinguished as vehicles enter the safety zones and leave the safety zones just before they reach the lamp assembly at the hillcrest. In one form of the invention, the road embedded components are vehicle detecting switch devices wired to a control circuit at the lamp assembly. In another form of the invention, the roadway embedded components are passive, radio frequency reflectors cooperating with micro-wave transmitters and reflectors at the lamp assembly to establish the safety zones and control illumination and extinguishing of the signal lamps by means of a pulse radar system.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view showing the layout of a traffic signalling system in accordance with the present invention.

FIGURE 2 is a side elevational view of the layout shown in FIGURE 1.

FIGURE 3 is a partial front elevational view of the lamp assembly associated with the layout shown in FIGURES 1 and 2.

FIGURE 4 is a partial transverse sectional view taken substantially through a plane indicated by section line 4—4 in FIGURE 5.

FIGURE 5 is an enlarged partial sectional view taken substantially through a plane indicated by section line 5—5 in FIGURE 1 showing one of the vehicle detecting switch devices associated with the layout shown in FIGURE 1.

FIGURE 6 is an electrical circuit diagram corresponding to the system illustrated in FIGURES 1-5.

FIGURE 7 is a top plan view of another form of traffic signalling system arranged in accordance with the present invention.

FIGURE 8 is a simplified circuit diagram illustrating the control system associated with the arrangement shown in FIGURE 7.

Referring now to the drawings in detail, and initially to FIGURES 1 and 2, it will be observed that the traffic signalling system of the present invention is associated with a roadway generally denoted by reference numeral 10 formed by two lanes 12 and 14 on opposite sides of the center line 16. A lamp assembly generally referred to by reference numeral 18 is mounted at a critical location, such as the hillcrest 20 on the roadway and is of such height as to be visible to motorists in vehicles approaching the hillcrest 20 in opposite directions. It will be apparent however, that the motorists within vehicles approaching the hillcrest from opposite directions will not be visible to each other. No-passing safety zones are accordingly established on either side of the lamp assembly 18 along the roadway. In the embodiment illustrated in FIGURES 1 and 2, the safety zone on one side of the hillcrest may be esablished between road embedded components 22 and 24 spaced from the hillcrest. Similarly, road embedded components 26 and 28 establish a safety zone on the other side of the hillcrest. A panel of signal lamps 30 are mounted by the lamp assembly over the lane 12 facing one direction for illumination when a vehicle 32 for example enters the safety zone on the other side of the lamp assembly approaching the hillcrest in the other lane 14. In the embodiment illustrated, the vehicle 32 enters the safety zone when it passes over the road embedded component 24 and leaves the safety zone when passing over the road embedded component 22 causing the lamp panel 30 to be extinguished. Illumination and extinction of the lamp panel 34 is similarly effected by vehicles entering and leaving the safety zone defined between the road embedded components 26 and 28 in order to warn motorists approaching the hillcrest along lane 14.

In one form of the invention shown in FIGURES 1 and 2, the road embedded components 22, 24, 26 and 28 are vehicle detecting switch devices such as more clearly seen in FIGURE 5 which extend substantially across the width of the lane within which they are positioned. Many types of such vehicle detecting switch devices are available and well-known. In one type of vehicle detecting switch device as shown in FIGURE 5, a treadle plate 36 may be downwardly depressed by the pneumatic tire of a vehicle passing thereover as shown by dotted lines so as to deform a supporting pad 40 within which a contact element 42 is embedded, causing the contact element to engage the fixed contact plate 44 to thereby momentarily complete a circuit for controlling the operating of the signal lamps as will be hereafter explained.

The lamp assembly 18 as more clearly seen in FIGURES 3 and 4 mount the signal lamp panels between spaced posts 46 that straddle the roadway and support a slanted roof structure which protects the signal lamp panels therebelow and also mounts a horizontal reflector 52. Thus, the reflector 52 may reflect the headlight beam of an approaching vehicle 32 for example as shown in FIGURE 2 downwardly so that it may be visible to vehicles approaching in the opposite direction from the other side of the hillcrest during nighttime when the vehicles have their headlights turned on. An optical warning system augmenting the signal lamp panels may thereby be provided by the lamp assembly.

With continued reference to FIGURES 3 and 4, rain gutters 54 may be mounted alongside of the roof structure so as to conduct rainwater to vertical drains 56 mounted on the post 48 in order to protect the signal lamp panels from water. Also, the roof structure may enclose therewithin the electrical control circuit through which the aforementioned vehicle detecting switch devices control illumination and extinction of the signal lamp panels.

FIGURE 6 illustrates a typical electrical control circuit that may be utilized in accordance with the principles of the present invention. Accordingly, a source of electrical voltage such as the battery 58 mounted within the lamp assembly 18 may be connected to the vehicle detecting switch devices 24, 22, 26 and 28. As shown, the switch devices 24 and 28 may be normally opened switches adapted to be momentarily closed in response to movement of a vehicle thereover while the switches 22 and 26 are normally closed and are adapted to be momentarily opened when a vehicle passes thereover. Momentary closing of the switch device 24 when the vehicle 32 for example enters the safety zone, completes an energizing circuit through the relay coil 60 so as to close the normally opened relay switches 62 and 64 associated therewith. Closing of the relay switch 62 establishes a holding circuit through the normally closed switch device 22 for the relay coil 60 so as to maintain it energized after the switch device is opened. Closing of the relay switch 64 on the other hand connects the battery 52 to the signal lamp panel 30 for illumination thereof. When the vehicle leaves the safety zone, the normally closed switch device 22 is momentarily opened so as to interrupt the energizing circuit for the relay coil 60 causing it to deenergize and open the relay switches including the relay switch 64 which interrupts the energizing circuit for the signal lamp panel 30. Thus, the signal lamp panel 30 is extinguished as the vehicle leaves the safety zone near the hillcrest 20. Vehicles entering the safety zone defined between the switch devices 28 and 26 similarly illuminate and extinguish the signal lamp 34 by means of the relay coil 66 and the associated, normally opened relay switches 68 and 70.

It will be apparent that the signalling system hereinbefore described will require extension of electrical conductors through the roadway from the vehicle detecting switch devices to the control circuit within the lamp assembly. A less expensive and perhaps more reliably operating system which avoids the use of road embedded conductors is shown in FIGURE 7 wherein lamp assembly 18 is provided with a radio transmitter 72 and a radio-receiver 74 cooperating with spaced components 76 and 78 embedded in the lane 12 of the roadway on one side of the hillcrest and spaced components 80 and 82 embedded in the lane 14 on the other side of the hillcrest. The components 76, 78, 80 and 82 are passive radio reflectors of any well-known suitable type tuned to the radiating frequency of the transmitter 72 which reradiates a diverging pattern of radio frequency energy 84 from either side of the lamp assembly 18 in order to establish the safety zones. A vehicle such as the vehicle 32 entering the effective radiation zone of the transmitter 72 on one side of the lamp assembly 18 will accordingly cause illumination of the signal lamp panel 30 for example facing vehicles approaching the lamp assembly in the other lane 12. When the vehicle 32 leaves the radiation zone at point 86 for example as shown in FIGURE 7, the signal lamp panel 30 is extinguished and remains extinguished even when the vehicle 32 reenters the radiation zone on the other side of the lamp assembly at point 88 for example as long as the vehicle is moving in the same direction along lane 14 as indicated by arrow 90. Illumination and extinction of the signal lamp panel 34 is effected in a similar manner by vehicles approaching and departing from the lamp assembly 18 along lane 12.

With reference to FIGURE 8, it will be observed that the radio transmitter 72 radiates energy through a directional transmitting antenna 92 from one side of a lamp assembly to establish the safety zone and some of the energy is reradiated by the reflectors 76 and 78 to the antenna 94 associated with the receiver 74. The reflectors are tuned to the radiating frequency which may be in the UHF or the lower micro-wave spectrum. Further, the energy is radiated in the form of a continuous train of short pulses as determined by the pulse modulator 96 connected to the transmitter for this purpose. The radio frequency energy-reradiated from the reflectors is received at the receiver 74 as relatively strong return pulses substantially stronger than the general background of reflected energy. In view of the spacing between the reflectors, these echo pulses will be received as a predetermined pulse sequence fed to a reflector gate generator 96 from which a corresponding pulse train is fed to a pulse sequence comparator 98. The output of the pulse modulator may also be fed to a reference gate generator 100 from which pulses are fed to the pulse sequence comparator 98 in order to recognize the predetermined pulse sequence reradiated to the receiver 70 from the reflectors 76 and 78 when there is no disturbance within the safety zone established by the radiation pattern extending from the transmitter antenna 92. Should this pulse sequence be disturbed by movement of the vehicle 32 for example into the safety zone, in the proper direction, an output pulse will be produced from the pulse sequence comparator 98 which is transmitted through the logic component 102 to a trigger component 104 from which the relay component 106 is energized to illuminate the signal lamp panel 30. Thus, the vehicle 32 while passing through the radiation zone will cause illumination of the lamp panel 30 until it passes out of the zone at point 86, so as to no longer disturb the pulse sequence established by the reflectors 76 and 78 causing extinction of the signal lamp panel 30.

As hereinbefore indicated, when the vehicle 32 reenters the radiation zone while departing from the lamp assembly at point 88 in FIGURE 7, the pulse sequence will again be disturbed. However, the effect of this disturbance is cancelled through the logic 102 by the canceller component 108. Toward this end, components of the signals from the transmitter 72 and receiver 74 are fed to a frequency comparator 110 so as to detect the presence of a moving object. As is well known, because of the Doppler effect there will be an increase in the radiation frequency of the energy reflected from the vehicle 32, as a result of the vehicle moving toward the transmitter. Movement of any vehicle in lane 12 away from the transmitter on the other hand will produce a decreasing frequency and an output from the frequency comparator 110 to which the pulse sequence canceller 108 responds in order to cancel any output from the pulse sequence comparator 98 fed to the logic 102. Thus, the disturbance of this pulse sequence by a vehicle in the zone departing from the lamp assembly in lane 12 will be cancelled so as to avoid illumination of the signal lamp panel 30. Only movement of the vehicle 32 toward the lamp assembly in lane 14 will cause a disturbance in the pulse sequence that is permitted to operate lamp panel 30. In a similar manner, the reflectors 80 and 82 will control illumination and extinction of the signal lamp panel 34 as a vehicle enters the radiation zone approaching the signal lamp 18 along lane 12 and departs therefrom. By spacing the reflectors 80 and 82 differently from the spacing of the reflectors 76 and 80, a different and separable pulse sequence may be established for controlling the illumination and extinction of the signal lamp panel 34 without interference with the control over the signal lamp panel 30.

It will be appreciated that the reflectors within the monitored zones on opposite sides of the lamp assembly will regulate operation of the system by sequential shadowing of the reflectors upon the passage of vehicles through the zones. Thus, another method may be used for signal cancellation which relies on the fact that a vehicle approaching the lamp assembly will shadow the reflectors in one sequence while a vehicle departing from the lamp assembly will shadow the same reflectors in the opposite sequence. One of the shadowing sequences is sensed by logic circuitry associated with the receiver in order to effect said signal cancellation and produce illumination of the proper signal lamp panel.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a vehicle traffic signalling system for a roadway having two lanes, a signal lamp assembly for indicating approach of vehicles in one direction along one lane to vehicles approaching in the opposite drection along the other lane, roadway embedded means establishing a monitored zone spaced from either side of said signal lamp assembly for detecting the presence of vehicles, and control means mounted on the lamp assembly for illumination thereof only in response to detection of vehicles within said monitored zones moving in directions approaching said lamp assembly.

2. The combination of claim 1 including a roof structure mounted in protective relation over the lamp assembly, and optical reflective means horizontally mounted by the roof structure for reflecting vehicle light beams from one side of the lamp assembly on the roadway to the other side.

3. The combination of claim 2 wherein said roadway embedded means comprises a pair of spaced vehicle detector switch devices extending substantially across each of the lanes along which vehicles approach the lamp assembly, said monitored zones being defined on each side of the lamp assembly between the spaced detector switch devices.

4. The combination of claim 1 wherein said roadway embedded means comprises a pair of spaced vehicle detector switch devices extending substantially across each of the lanes along which vehicles approach the lamp assembly, said monitored zones being defined on each side of the lamp assembly between the spaced detector switch devices.

5. The combination of claim 1 wherein said roadway embedded means comprises a pair of radiant energy reflectors spaced from the lamp assembly in each of the lanes along which vehicles depart from the lamp assembly.

6. The combination of claim 5 wherein said control means comprises a transmitter radiating radiant energy reradiated by said reflectors to establish the monitored zones, a receiver detecting reflected energy from said reflectors, and signal selecting means connected to the receiver responsive to disturbance of said reflected energy by vehicles moving only through said monitored zones in directions approaching the lamp assembly for illuminating the lamp assembly.

7. The combination of claim 6, wherein said reflectors are passive elements tuned to the radiating frequency of the transmitter.

8. The combination of claim 7, wherein said radiant energy is in the form of microwave pulses, the reflected energy from the spaced reflectors forming a sequence of pulses recognized by the signal selecting means.

9. The combination of claim 8 including a roof structure mounted in protective relation over the lamp assembly, and optical reflective means horizontally mounted by the roof structure for reflecting vehicle light beams from one side of the lamp assembly on the roadway to the other side.

References Cited

UNITED STATES PATENTS 3,156,386   7/1965   Rossi _____ 340—31

THOMAS B. HABECKER, *Primary Examiner.*

U.S. Cl. XR.

40—52